US011507353B1

(12) United States Patent
Soeters (10) Patent No.: US 11,507,353 B1
(45) Date of Patent: Nov. 22, 2022

(54) ADAPTING PRE-COMPILED EBPF PROGRAMS AT RUNTIME FOR THE HOST KERNEL BY OFFSET INFERENCE

(71) Applicant: International Business Machines Corporation, Armonk, NY (US)

(72) Inventor: Wilhelmus Franciscus Hieronymus Soeters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/375,088

(22) Filed: Jul. 14, 2021

(51) Int. Cl.
*G06F 8/41* (2018.01)
*G06F 9/54* (2006.01)
*G06F 8/60* (2018.01)
*G06F 9/445* (2018.01)
*G06F 9/34* (2018.01)

(52) U.S. Cl.
CPC ............... *G06F 8/441* (2013.01); *G06F 8/60* (2013.01); *G06F 9/34* (2013.01); *G06F 9/44589* (2013.01); *G06F 9/545* (2013.01)

(58) Field of Classification Search
None
See application file for complete search history.

(56) References Cited

U.S. PATENT DOCUMENTS

| | | | |
|---|---|---|---|
| 9,648,133 B2 | 5/2017 | Owens | |
| 10,530,711 B2 | 1/2020 | Yu | |
| 10,623,372 B2 | 4/2020 | Wang | |
| 2019/0140983 A1* | 5/2019 | Tu | ............ H04L 43/028 |
| 2019/0173841 A1* | 6/2019 | Wang | ............... G06F 9/5083 |
| 2019/0324882 A1* | 10/2019 | Borello | ................ G06F 8/43 |
| 2020/0193017 A1* | 6/2020 | Bannister | ............ G06F 21/556 |
| 2020/0236093 A1* | 7/2020 | Bannister | ............ H04L 9/3263 |

(Continued)

FOREIGN PATENT DOCUMENTS

| | | |
|---|---|---|
| CN | 102819527 A | 12/2012 |
| CN | 110971482 A | 4/2020 |

(Continued)

OTHER PUBLICATIONS

"Build 182," Instana Docs, IBM Corporation, Jul. 21, 2020, 5 pages. Grace Period Disclosure.

(Continued)

*Primary Examiner* — Qing Chen
(74) *Attorney, Agent, or Firm* — VanLeeuwen & VanLeeuwen; Alexander G. Jochym (57) ABSTRACT

An approach is provided in which a method, system, and computer program product load a first program and a second program on a target host that includes a host kernel. The first program and the second program are both pre-compiled on a build system that is different from the target host. The method, system, and computer program product execute at least a subset of the first program on the host kernel and the subset of the first program captures a set of kernel structure information from the host kernel. The method, system, and program product load, at the target host, the set of kernel structure information into the second program at one or more placeholder locations. Then, the method, system and program product execute at least a subset of the second program with the set of kernel structure information on the target kernel.

25 Claims, 10 Drawing Sheets

(56) References Cited

U.S. PATENT DOCUMENTS

2020/0274952 A1    8/2020  Waskiewicz
2020/0364375 A1*  11/2020  Bottomley .............. G06F 21/53
2021/0019197 A1    1/2021  Tamir

FOREIGN PATENT DOCUMENTS

CN        111355686 A    6/2020
CN        112532538 A    3/2021
CN        112564967 A    3/2021

OTHER PUBLICATIONS

"Monitoring OS Process," Instana Docs, IBM Corporation, Jul. 21, 2020, 8 pages. Grace Period Disclosure.
Miancioppi, "Never miss another crash! Instana's Crash Detector brings real-time Abnormal Process Termination analysis to Linux," IBM Corporation, Aug. 17, 2020, 8 pages. Grace Period Disclosure.
Gregg, "BPF binaries: BTF, CO-RE, and the future of BPF perf tools," Brendan Gregg's Blog, Nov. 4, 2020, 5 pages.

\* cited by examiner

Preflight Executable Program 310

```
#include "lib/exitsnoop.h"

BPF_PERF_OUTPUT(events);

int trace_entry(struct pt_regs *ctx)
{
    struct task_struct *task = (typeof(task))bpf_get_current_task();   ← Helper 810
    int I;

struct kmemsnoop_event_t e = {
        .seq = 0,
    };
    bpf_get_current_comm(&e.comm, sizeof(e.comm));   ← Helper 820 char preflight_comm[] = "ebpf-preflight-";
    #pragma unroll
    for (i = 0; i < 15; i++) {
        if (e.comm[i] != preflight_comm[i])
            return 0;
    }                                                  ← 830 pragma unroll
    for (i = 0; i < CHUNKS; i++) {
        e.seq = i;
        bpf_probe_read(&e.buf, CHUNK_SIZE, (void *)task + i * CHUNK_SIZE);
        events.perf_submit(ctx, &e, sizeof(e));
    }                                                  ← 840 return 0;
}
```

*FIG. 8*

Sensor eBPF
Program
330

```
#include <linux/sched.h>              900
#include "lib/exitsnoop.h"

BPF_PERF_OUTPUT(events);

int trace_entry(struct pt_regs *ctx)
{
   struct task_struct *task = (typeof(task))bpf_get_current_task();
   if (task->exit_code == 0) { return 0; }
   struct data_t data = {              910
      .pid = task->tgid,        920    930
      .exit_code = task->exit_code >> 8,
      .sig_info = task->exit_code & 0xFF,
   };                                  940
   events.perf_submit(ctx, &data, sizeof(data));
   return 0;
}
```

FIG. 9

Modified Sensor Source Code 1000

```
instructions[11] = libbpf::bpf_insn {
    code: 0x85,
    _bitfield_1: libbpf::bpf_insn::new_bitfield_1(0, 0),
    off: 0,
    imm: 4,
};
instructions[12] = libbpf::bpf_insn {
    code: 0x61,
    _bitfield_1: libbpf::bpf_insn::new_bitfield_1(1, 10),
    off: -16,
    imm: 0,
};
instructions[13] = libbpf::bpf_insn {
    code: 0x15,
    _bitfield_1: libbpf::bpf_insn::new_bitfield_1(1, 0),
    off: 37,
    imm: 0,
};
instructions[14] = libbpf::bpf_insn {
    code: 0x63,
    _bitfield_1: libbpf::bpf_insn::new_bitfield_1(10, 9),
    off: -16,
    imm: 0,
};
instructions[15] = libbpf::bpf_insn {
    code: 0x7,
    _bitfield_1: libbpf::bpf_insn::new_bitfield_1(8, 0),
    off: 0,
    imm: %%PID_OFFSET%%,   ← Offset Placeholder 1010
};
instructions[16] = libbpf::bpf_insn {
    code: 0xbf,
    _bitfield_1: libbpf::bpf_insn::new_bitfield_1(1, 10),
    off: 0,
    imm: 0,
};
```

ADAPTING PRE-COMPILED EBPF PROGRAMS AT RUNTIME FOR THE HOST KERNEL BY OFFSET INFERENCE

STATEMENT REGARDING PRIOR DISCLOSURES BY THE INVENTOR

The following disclosures are submitted under 35 U.S.C. 102(b)(1)(A):
1. "Build 182," Instana Docs, IBM Corporation, Jul. 21, 2020, 5 pages.
2. "Monitoring OS Process," Instana Docs, IBM Corporation, Jul. 21, 2020, 8 pages.

BACKGROUND

Linux is a family of open-source operating systems based on a Linux kernel, which is a monolithic kernel with a modular design and supports features once only available in closed source kernels. The Linux kernel includes a technology called extended Berkeley Packet Filter (eBPF) that enables small programs to run in the Linux kernel.

eBPF programs are utilized by monitoring/observability tools because eBPF programs hook directly into various subsystems of the Linux kernel (e.g., networking, process management, filesystems, etc.) and capture meaningful events and metrics. Some eBPF programs perform aggregations in kernel space and send the aggregated values to user space, which is more efficient than sending an entire set of captured metrics to user space and requiring a program in user space to perform the aggregation.

Because eBPF programs have access to kernel data structures and therefore need access to kernel headers at compilation time, eBPF programs are typically compiled on a specific target host on which they execute. As such, existing approaches that utilize eBPF programs require both a compiler toolchain as well as the kernel headers be on a specific target host to successfully compile the eBPF programs.

BRIEF SUMMARY

According to one embodiment of the present disclosure, an approach is provided in which a method, system, and computer program product load a first program and a second program on a target host that includes a host kernel. The first program and the second program are both pre-compiled on a build system that is different from the target host. The method, system, and computer program product execute at least a subset of the first program on the host kernel, and the subset of the first program captures a set of kernel structure information from the host kernel. The method, system, and program product load, at the target host, the set of kernel structure information into the second program at one or more placeholder locations. Then, the method, system and program product execute at least a subset of the second program with the set of kernel structure information on the target kernel.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
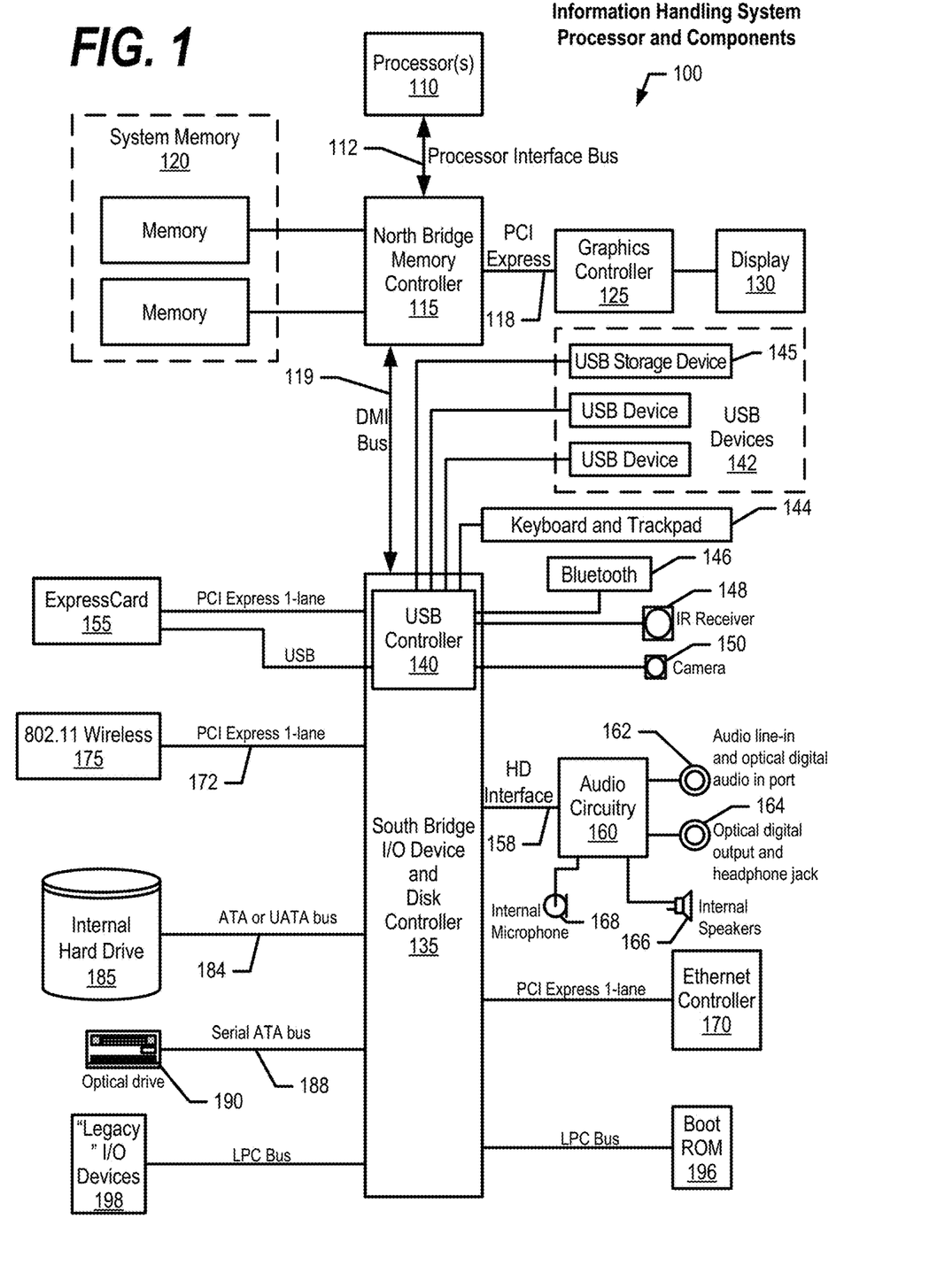
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
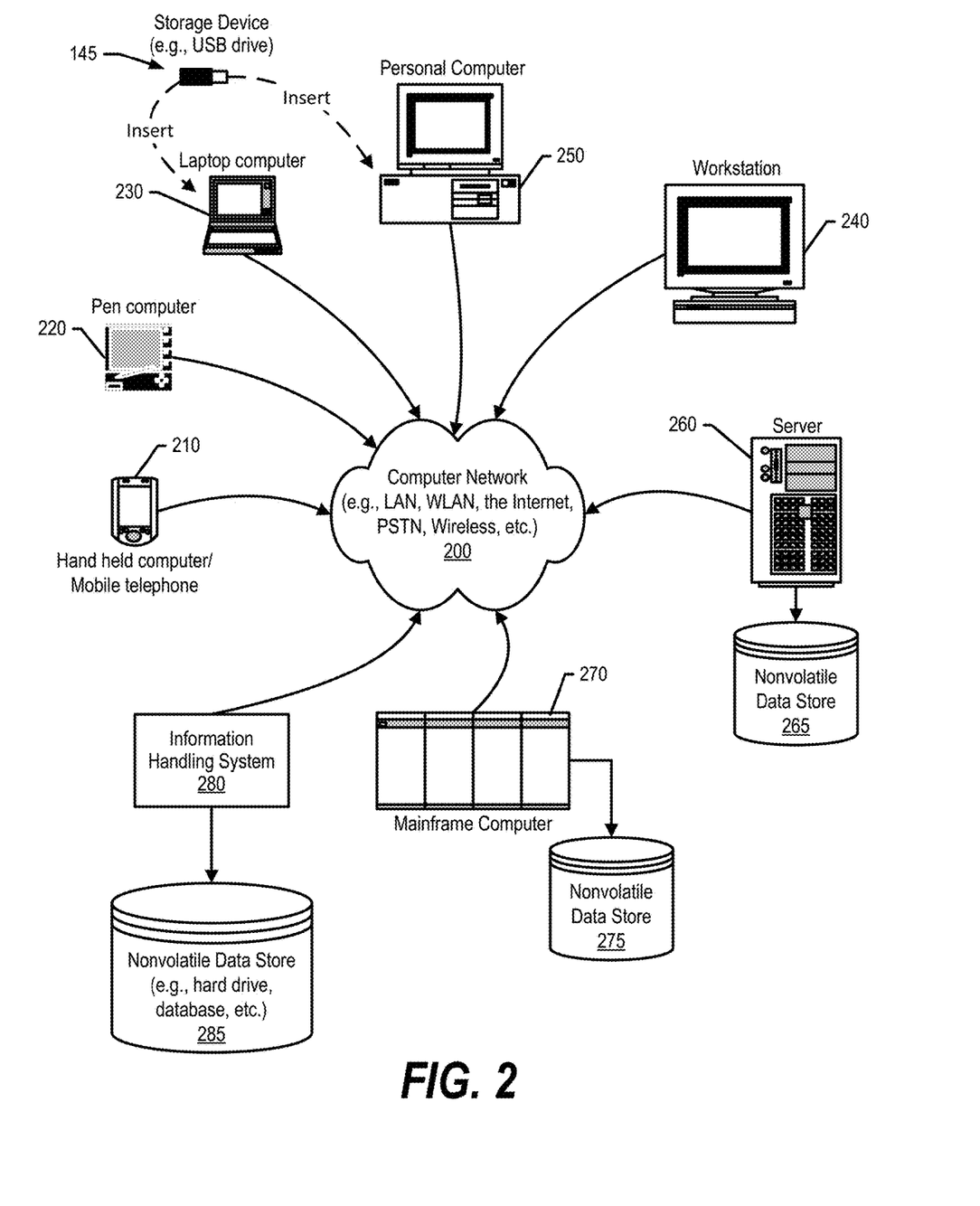
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, eBPF programs have access to kernel data structures and therefore need access to the kernel headers at compile time to obtain kernel structure information. A challenge found with existing approaches is that invoking a heavyweight compiler toolchain on a production target host running a well-balanced workload is not ideal because the main purpose of monitoring/observability tools (eBPF programs) is to observe the performance characteristics of production workloads. In other words, starting a resource-hungry process on the target host, such as a compiler, has the potential of impacting the performance of the production workloads being monitored.

Another challenge found with existing approaches is that although a build system could ship compiler toolchain dependencies with eBPF instrumentation code, the build system does not have the kernel header dependencies because the kernel header dependencies are based on specific kernel structure information configured by a specific target host at compile-time of a specific kernel. Some existing approach rely on BPF Type Format (BTF) debug symbols to resolve this challenge, but even these existing approaches still require recompilation of the kernel to infer the structure information at run-time.

FIGS. 3 through 10 depict an approach that can be executed on an information handling system that uses a pre-compiled preflight program to capture a target host's kernel structure information (e.g., kernel memory offsets) and inserts the kernel structure information into one or more pre-compiled sensor eBPF programs that, in turn, execute on the target host's kernel. Kernel structure information includes information about data types in the kernel, such as offsets, length of data types, etc.

The approach uses a separate build system to compile the preflight eBPF program and sensor eBPF programs, and insert placeholders into the sensor eBPF programs that are eventually replaced at runtime with kernel-specific parameters (e.g., memory offset values). At run-time on a target host, the preflight program captures memory offset values of the kernel's memory and replaces the placeholders in the sensor eBPF programs with the memory offset values. In turn, the sensor eBPF programs execute on the target host using the memory offset values. As described herein, a preflight program and a sensor program are eBPF programs in bytecode, but other types of programs may be implemented to capture kernel structure information and utilize the captured kernel structure information to execute the other types of programs on a target host's kernel.

As defined herein, an "executable program" is a set of machine code instructions that is directly executable by a kernel, and a "bytecode program" is intermediate code generated from compiling source code that is executable by a virtual machine.

Also as defined herein, a "kernel parameter-independent program" is a program that is not dependent upon kernel structure information, such as kernel memory offset values, whereas a "kernel parameter-dependent program" is a program that is dependent upon kernel structure information, such as a kernel memory offset value. In one embodiment, the approach discovers the memory offsets by using a kernel parameter-independent eBPF program (preflight eBPF program) to access the kernel memory, flush the memory to user space, and then search for well-known data points within arrays of kernel memory to determine the memory offsets at runtime.

The approach described herein improves on prior approaches that rely on the target host's kernel compilation process to provide the memory offsets to eBPF programs because the approach eliminates the requirement for a target host to have a compiler toolchain and consume resources to compile programs. Another advantage of the approach discussed herein over prior approaches is that the approach has no dependencies on kernel debug symbols and therefore works with any kernel that supports eBPF technology.

Figure 3:
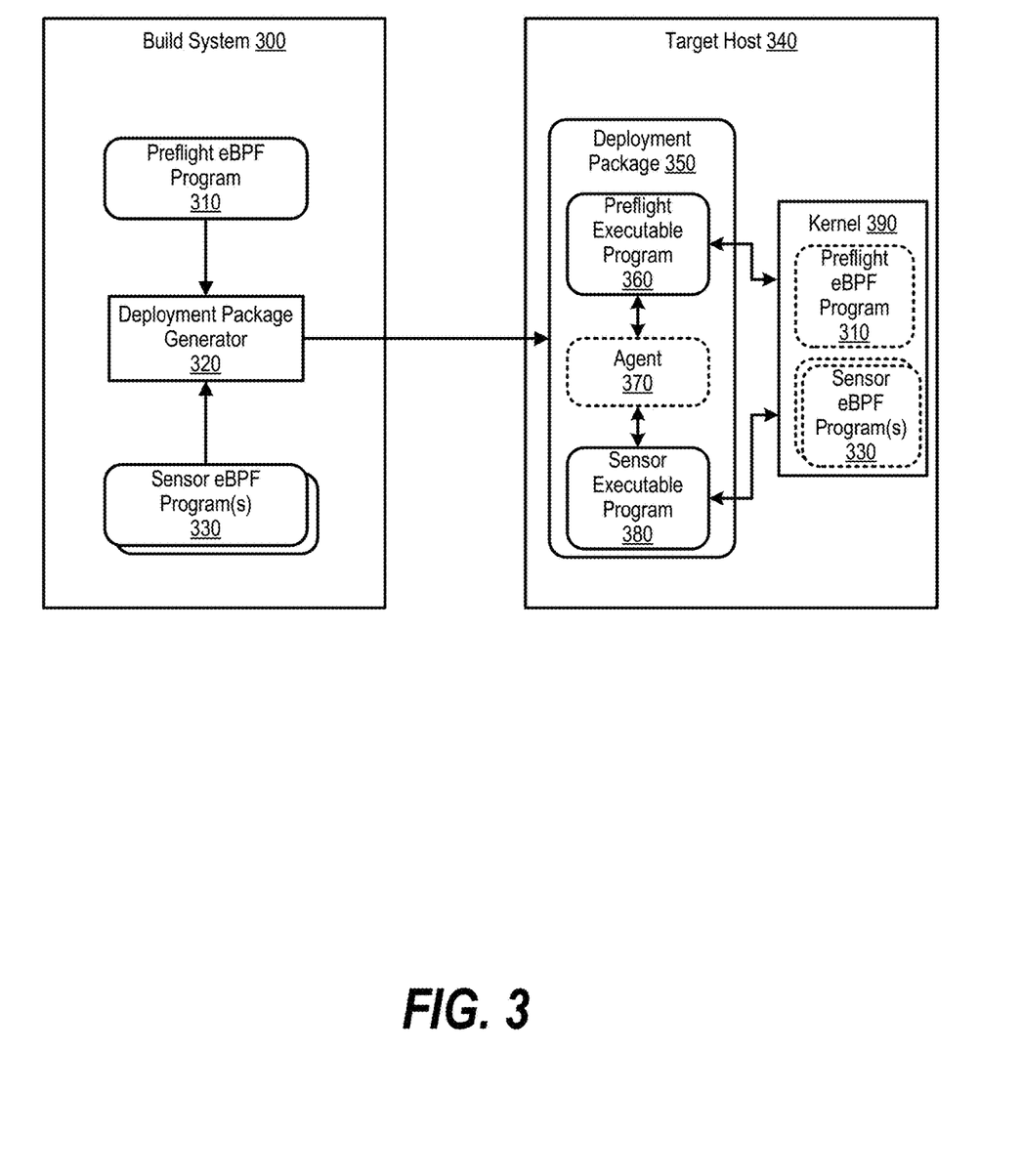
FIG. 3 is an exemplary diagram depicting a build system that generates and deploys a deployment package to a target host that, in turn, executes on the target host to capture kernel memory offsets and utilizes the captured memory offsets to execute sensor eBPF programs.

FIG. 3 is an exemplary diagram depicting a build system that generates and deploys a deployment package to a target host that, in turn, executes on the target host to capture kernel memory offsets and utilize the captured kernel memory offsets to properly execute sensor eBPF programs.

Build system 300 uses deployment package generator 320 to generate deployment package 350. Deployment package generator 320 uses preflight eBPF program 310 to build preflight executable program 360. Deployment package generator 320 modifies sensor eBPF program(s) 330 by inserting offset placeholders in sensor eBPF program(s) 330 that require kernel memory offset values and builds sensor executable program 380 using the modified sensor eBPF program(s) 330 (see FIGS. 5, 8, 9, 10, and corresponding text for further details).

In one embodiment, deployment package generator 320 executes a code generation pipeline in the build pipeline that compiles eBPF byte code and generates a source code file in the same language as host program instrumentation. In this embodiment, the source code file includes an array variable that initializes with structures representing the eBPF byte code instructions.

Target host 340 receives deployment package 350 from build system 300 and starts preflight executable program 360, which loads preflight eBPF program 310 into kernel 390. Once preflight executable program 360 loads preflight eBPF program 310, preflight executable program 360, in one embodiment, forks a different process with a unique name and exits the process with specific exit code. The exiting triggers preflight eBPF program 310 because preflight eBPF program 310 is attached to a sched_process_exit tracepoint provided by kernel 390 (see FIGS. 4, 6, and corresponding text for further details). Preflight eBPF program 310 transfers an array of kernel memory, starting from the task struct pointer and long enough to reasonably include the interesting fields into user space (preflight executable program 360). Preflight executable program 360 then scans for known values to determine the memory offsets in kernel memory (see FIGS. 4, 6, and corresponding text for further details). Other approaches may be implemented to capture other kernel structure information.

Figure 4:
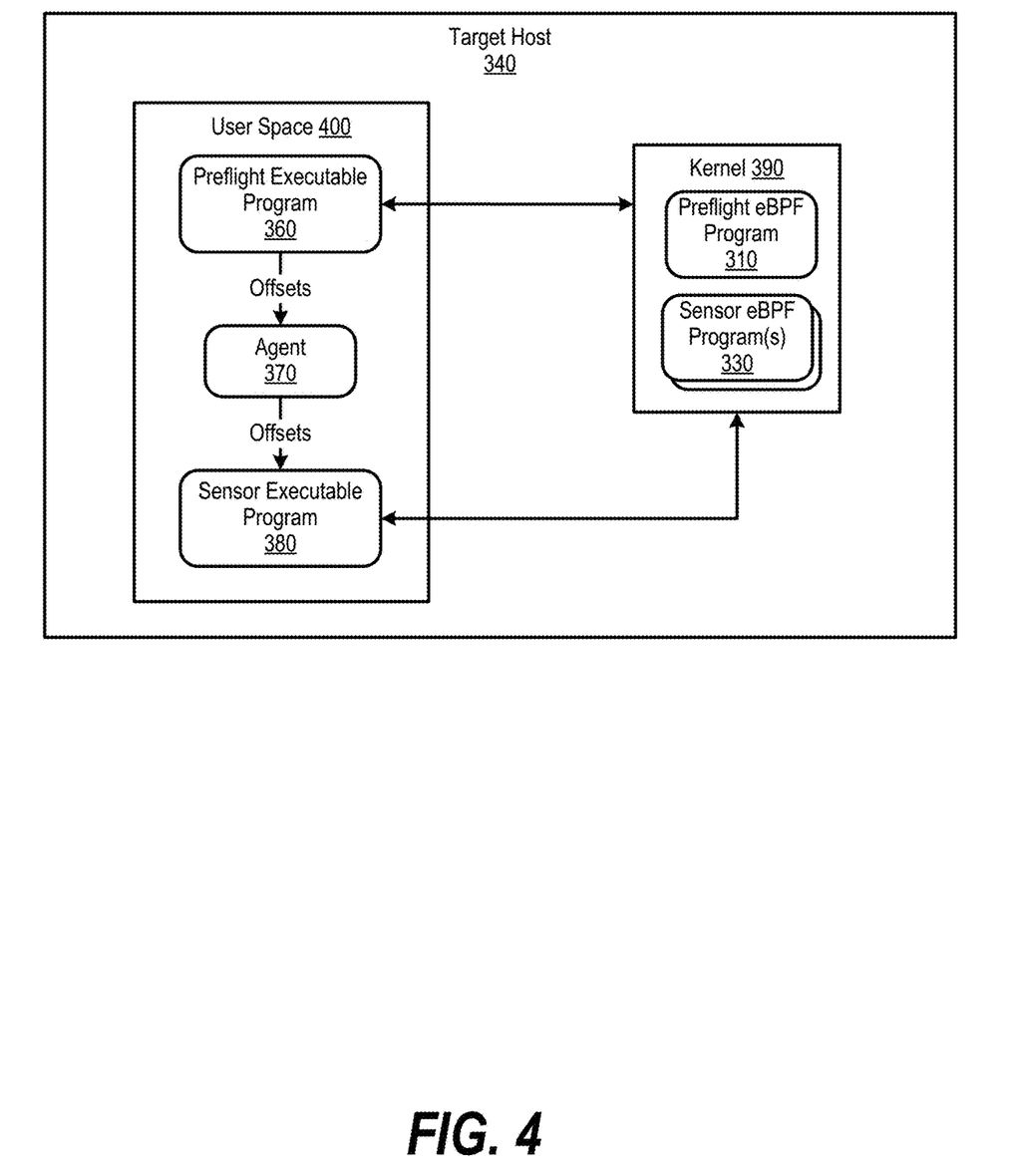
FIG. 4 is an exemplary diagram depicting a preflight executable program, sensor executable program, and an agent that captures kernel memory offsets and utilizes the captured memory offsets to execute sensor eBPF programs.
Figure 7:
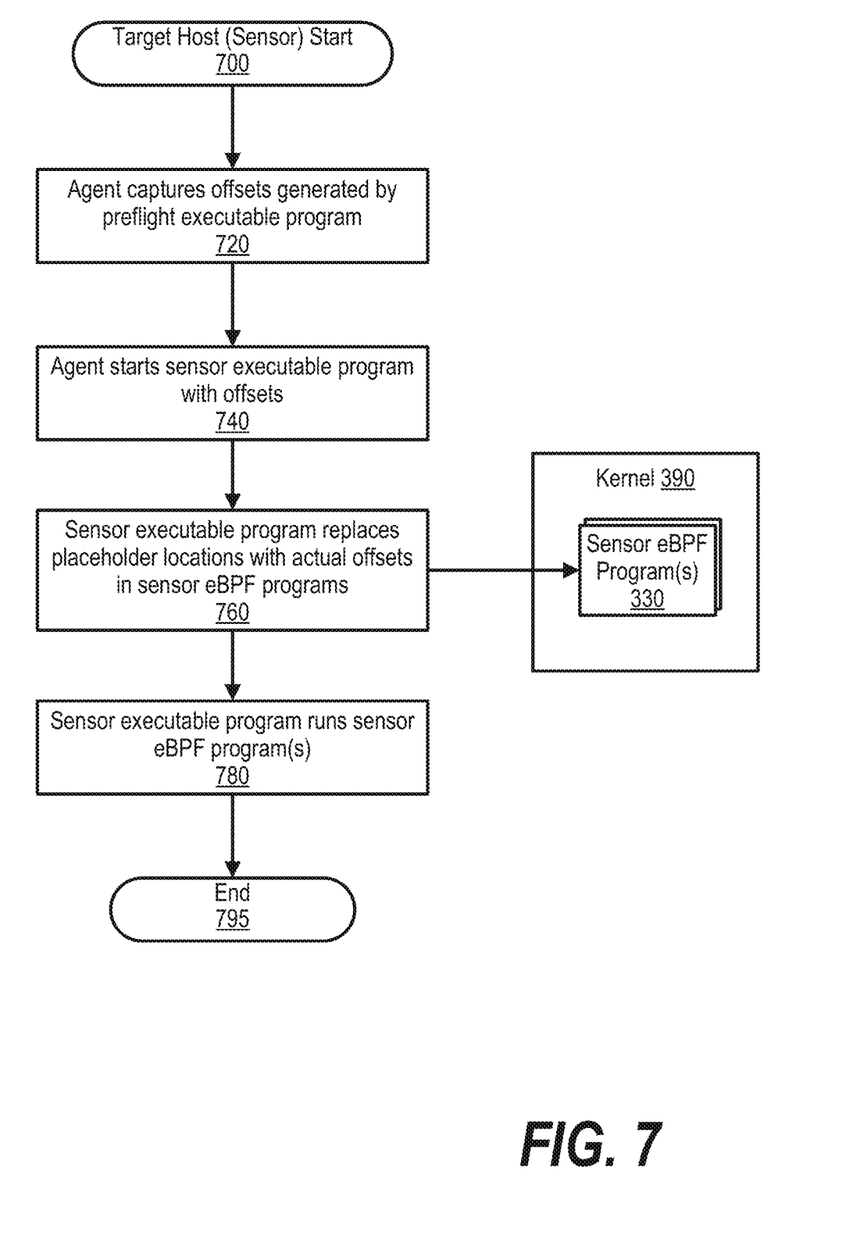
FIG. 7 is an exemplary flowchart showing steps taken by a sensor executable program to run on a target host with loaded memory offsets.

Agent 370 (resides on target host 340) receives the memory offsets and provides them to sensor executable program 380, which inserts them in the bytecode of the various sensor eBPF program(s) 330 at the inserted offset placeholder locations just before they are loaded into kernel 390 (see FIGS. 4, 7, and corresponding text for further details). In turn, sensor eBPF program(s) 330 execute on target host 340 using the kernel memory offset values.

FIG. 4 is an exemplary diagram depicting a preflight executable program, sensor executable program, and an agent that captures kernel memory offsets and utilizes the captured memory offsets to execute sensor eBPF programs.

Preflight executable program 360, agent 370, and sensor executable program 380 execute in user space 400. In one embodiment, preflight executable program 360 is binary code that uses preflight eBPF program 310 (bytecode) to discover machine-specific values (e.g., memory offsets) of kernel 390 executing on target host 340. Preflight eBPF program 310 is a kernel parameter-independent program and therefore not dependent upon kernel headers or kernel structure information. In addition, preflight eBPF program 310 ships in pre-compiled form, thereby not depending on a compiler toolchain on target host 340 and therefore avoiding performance challenges of prior approaches discussed above.

In one embodiment, preflight executable program 360 loads preflight eBPF program 310 into an eBPF virtual machine. Preflight executable program 360 then forks and exits a process, causing kernel 390 to populate kernel memory (e.g., task struct) with a process id (PID) and exit code, respectively. Preflight eBPF program 310 then sends memory array information relevant to the forked process to preflight executable program 360. When the memory array reaches user space 400, preflight executable program 360 scans the array for the well-known values. In one embodiment, preflight executable program 360 includes lines of code that loop through the memory array and search for sub-arrays that include bytes of the values of interest. For example, a process ID (PID) "1234" results in a sub-array of [210, 4, 0, 0] where the index of the first byte "210" in the array of kernel memory represents the offset of the PID field in the task struct.

Agent 370, in turn, provides the memory offset values to sensor executable program 380; replaces the offset placeholders in sensor eBPF program(s) 330 with the memory offset values; and loads sensor eBPF program(s) 330 with memory offset values into kernel 390, or an eBPF virtual machine executing on kernel 390.

Figure 5:
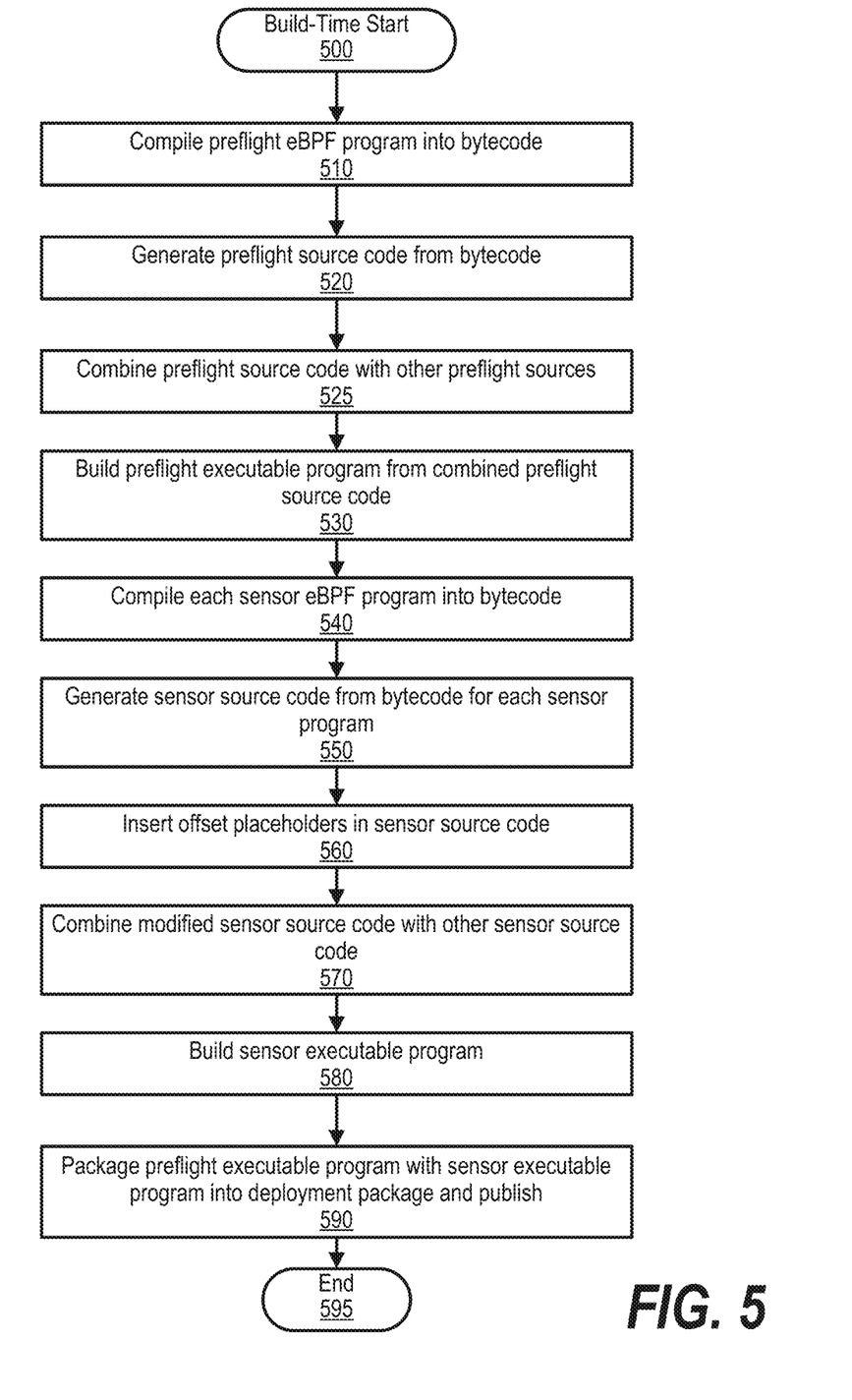
FIG. 5 is an exemplary flowchart showing steps taken to build a deployment package that includes a preflight executable program and a sensor executable program.

FIG. 5 is an exemplary flowchart showing steps taken to build a deployment package that includes a preflight executable program and sensor executable program. Build system 300 may perform steps to build deployment package 350 in a different order than what is shown in FIG. 5, such as performing preflight executable generation steps in parallel with performing sensor executable generation steps.

FIG. 5 processing commences at 500 whereupon, at step 510, the process compiles preflight eBPF program 310 into bytecode and, at step 520, the process generates preflight source code from the bytecode. At step 525, the process combines the preflight source code with other preflight source code. At step 530, the process builds preflight executable program 360 from the combined preflight source code in step 530.

Figure 10:
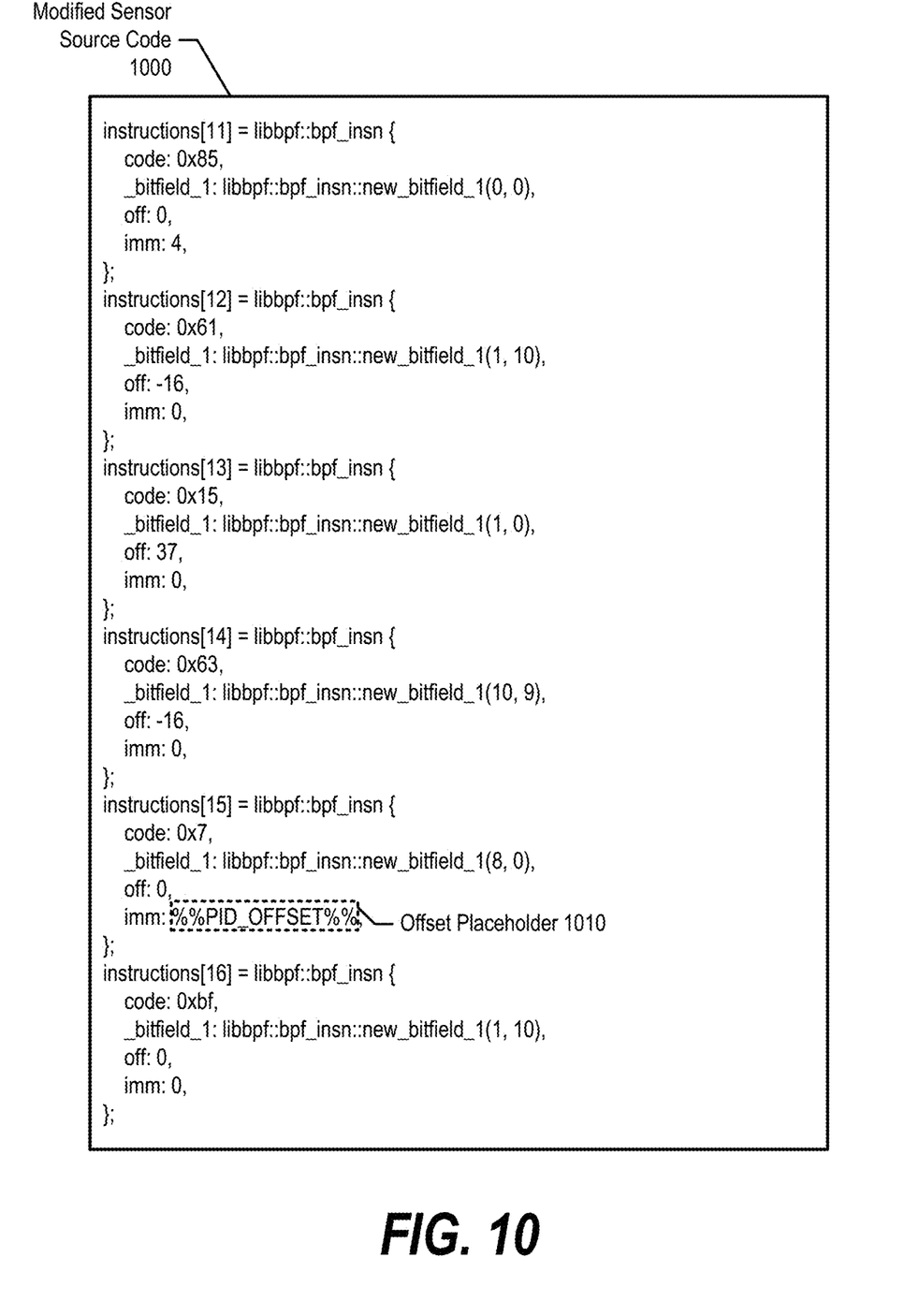
FIG. 10 is an exemplary diagram depicting a modified sensor source code program that includes an offset placeholder.

At step 540, the process compiles sensor eBPF programs 330 into bytecode and, at step 550, the process generates sensor source code from the compiled sensor programs. At step 560, the process modifies the sensor source code by inserting offset placeholders in the sensor source code at locations that rely on kernel memory offset values. Referring to FIG. 10, the process searches for areas in the source code that includes offsets and inserts an offset placeholder in line 1010.

At step 570, the process combines the modified sensor source code with other sensor source code. In one embodiment, the process retrieves other source code text and combines the modified sensor source code with the retrieved source code text. In another embodiment, the process performs steps 540 through 560 for multiple sensor eBPF programs. In this embodiment, the process performs steps 540 through 560 for each of the sensor eBPF programs and then combines the multiple sets of modified sensor source code at step 570.

At step 580, the process builds sensor executable program 380 from the combined sensor source code in step 570. At step 590, the process packages preflight executable program 360 with sensor executable program 380 and publishes them into deployment package 350. FIG. 5 processing thereafter ends at 595.

Figure 6:
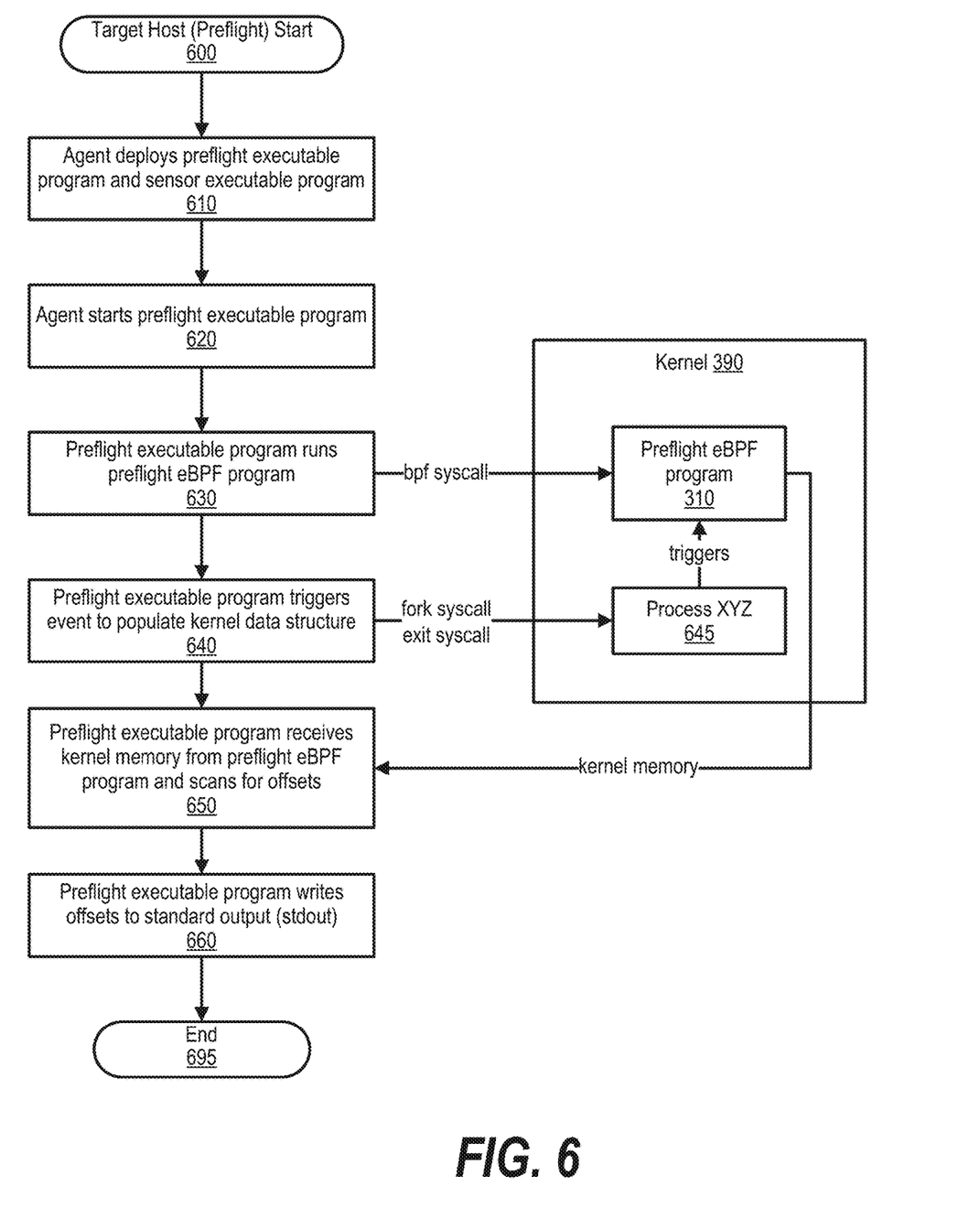
FIG. 6 is an exemplary flowchart showing steps taken by the preflight executable program and the preflight eBPF program to capture memory offsets in the target host.

FIG. 6 is an exemplary flowchart showing steps taken by the preflight executable program and the preflight eBPF program to capture memory offsets in the target host. FIG. 6 processing commences at 600 whereupon, at step 610, agent 370 deploys preflight executable program 360 and sensor executable program 380 on target host 340. At step 620, agent 370 starts preflight executable 370.

At step 630, preflight executable 370 runs preflight eBPF program 310 in kernel 390 using a bpf syscall command. At step 640, in one embodiment, preflight executable program 360 triggers an event to populate a kernel data structure (task struct). In one embodiment, as shown in FIG. 6, preflight executable program 360 sends a fork syscall command and an exit syscall command to kernel 390, which causes kernel 390 to fork child process XYZ 645, for example, and then exit child process XYZ 645 with specific exit code.

Exiting child process XYZ 645 triggers preflight eBPF program 310 because preflight eBPF program 310 is attached to a sched_process_exit tracepoint. As such, the task struct (exit code) that is passed to preflight eBPF program 310 identifies the process that was forked and exited (child process XYZ 645).

Figure 8:
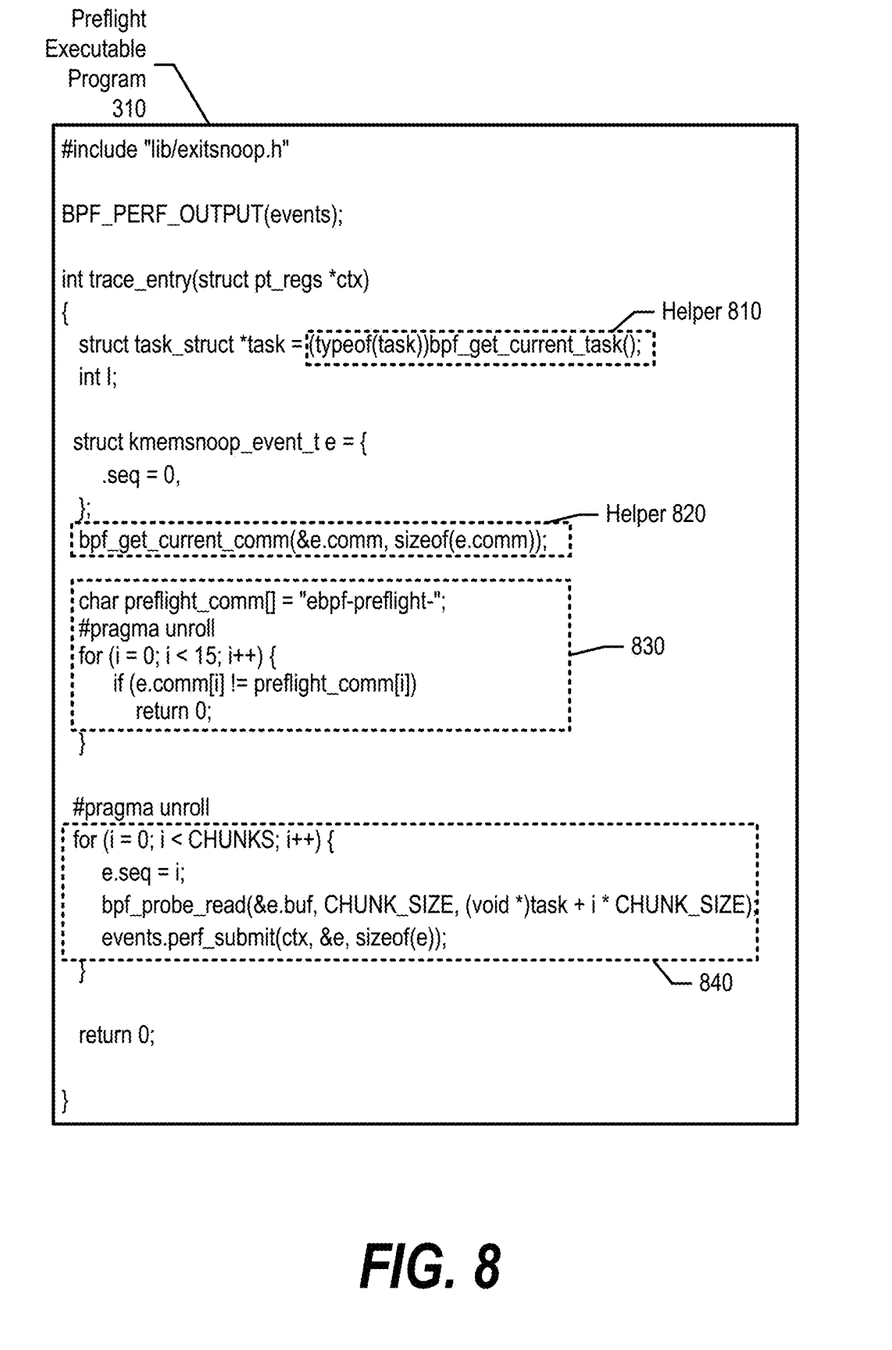
FIG. 8 is an exemplary diagram depicting a preflight executable program written to capture memory offsets in a target host kernel.

Referring to FIG. 8, preflight eBPF program 310 includes two "helpers," which are helper 810 and helper 820. Helper 810 'bpf_get_current_task' provides a pointer to the task struct (task struct pointer) of the process triggering preflight eBPF program 310 (e.g., child process XYZ 645). Helper 820 'pf_get_currrent_comm' provides the comm attribute (process command) of the task, which includes the name of the executable that is then used to keep events from child process XYZ 645 and filter out other events from other processes that may be exiting in the same timeframe (discussed below).

At step 650, preflight executable program 360 receives kernel memory from preflight eBPF program 310 and scans the kernel memory for offsets. In one embodiment, preflight eBPF program 310 transfers an array of kernel memory, starting from the task struct pointer and long enough to reasonably include the interesting fields into user space (preflight executable program 360).

Then, preflight executable program 360 scans the memory array from preflight eBPF program 310 for known values corresponding to child process XYZ 645. For example, child process XYZ 645's process ID and thread group ID (PID/TGID) is set upon creation of child process XYZ 645 and the exit code is populated by kernel 390 just prior to the tracepoint triggers (e.g., exit syscall). As such, preflight executable program 360 scans the memory array for bytes of the PID, which is included in the memory array's TGID field and PID field. In addition, preflight executable program 360 scans the memory array for the exit code.

At step 660, preflight executable 370 writes the offsets to a standard output (stdout) that sensor eBPF program(s) 330 eventually utilize for execution (see FIG. 7 and corresponding text for further details). FIG. 6 processing thereafter ends at 695.

FIG. 7 is an exemplary flowchart showing steps taken to replace offset placeholders in sensor eBPF programs with kernel memory offset values and execute the sensor programs in the kernel accordingly. FIG. 7 processing commences at 700 whereupon, at step 720, agent 370 captures memory offset values provided by preflight executable program 360 (FIG. 6, step 660). At step 740 agent 370 starts sensor executable program 380 with the captured offsets. In one embodiment, preflight executable program 360 writes the offsets to a standard output (stdout) file and then agent 370 sets the offsets as variables in the environment of sensor executable program 380.

At step 760, sensor executable program 380 replaces the offset placeholders in sensor eBPF program(s) 330 with the actual kernel memory offset values from step 720. At step 780, sensor executable program 380 runs sensor eBPF program(s) 330 on kernel 390 using the offsets and FIG. 7 processing thereafter ends at 795 (e.g., when agent 370 terminates).

FIG. 8 is an exemplary diagram depicting a preflight program written to capture memory offsets in a target host kernel. Preflight eBPF program 310 is an eBPF program that attaches to a sched_process_exit tracepoint and is responsible for sending an array of kernel memory starting from a task struct of an exiting process to user space via a perf ring buffer created by a BPF PERF OUTPUT macro.

Preflight eBPF program 310 includes helper 810 and 820. As discussed above, helper 810 'bpf_get_current_task' provides a pointer to the task struct (task struct pointer) of the process triggering preflight eBPF program 310 (e.g., child process XYZ 645) and helper 820 'bpf_get_currrent_comm' provides the comm attribute (name of the executable excluding the path) of the task.

Lines 830 filter out events that are not relevant to the process that was forked and exited by previously exiting preflight eBPF program 310 when the comm field doesn't match the name of preflight executable program 360. This filtering filters out other processes exiting on the host in the same timeframe. Lines 840 send the kernel memory, filtered from lines 830, to user space 400.

Figure 9:
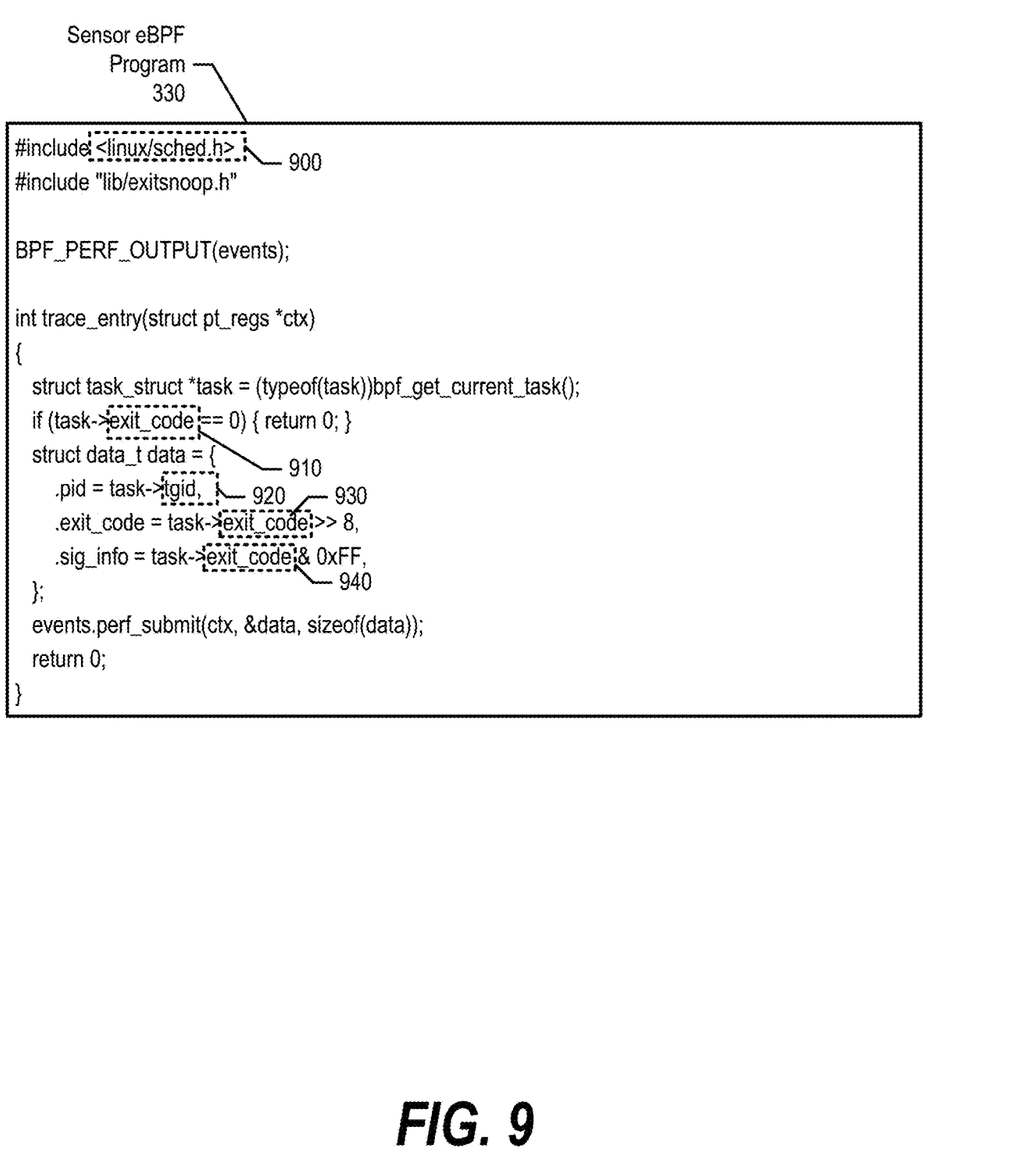
FIG. 9 is an exemplary diagram depicting a sensor eBPF program.

FIG. 9 is an exemplary diagram depicting a sensor eBPF program. Line 900 shows that sensor eBPF program 330 relies on Linux kernel headers. As such, deployment package generator 320 replaces lines 910, 920, 930, and 940 with offset placeholders as described herein.

FIG. 10 is an exemplary diagram depicting a modified sensor source code program that includes an offset placeholder. Modified sensor source code 1000 includes offset placeholder 1010, which is eventually replaced with a kernel memory offset value of kernel 390 executing in target host 340 as discussed herein. Deployment package generator 320 compiles modified sensor source code 1000 and includes in sensor executable program 380 that deploys to target host 340.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A computer-implemented method comprising:
    loading a first program and a second program on a target host comprising a host kernel, wherein both the first program and the second program are pre-compiled by a build system that is different from the target host;
    executing at least a subset of the first program on the host kernel, wherein the subset of the first program captures a set of kernel structure information from the host kernel;
    loading, at the target host, the set of kernel structure information into the second program at one or more placeholder locations; and
    executing at least a subset of the second program with the set of kernel structure information loaded at the target host at the one or more placeholder locations.

2. The computer-implemented method of claim 1 wherein the first program is a kernel parameter-independent program and the second program is a kernel parameter-dependent program.

3. The computer-implemented method of claim 1 wherein the first program is a binary program executing in user space and the subset of the first program is a first extended Berkley Packet Filter (eBPF) program executing in kernel space.

4. The computer-implemented method of claim 3 further comprising:
    loading, by the first program, the first eBPF program into the host kernel;
    in response to loading the first eBPF program into the host kernel, invoking a trigger event by the first program that causes the host kernel to fork a child process and exit the child process;
    capturing, by the first eBPF program, a memory array corresponding to the host kernel in response to the host kernel exiting the child process; and
    determining a memory offset value of the host kernel based on the captured memory array.

5. The computer-implemented method of claim 4 wherein, in response to the host kernel exiting the child process, the computer-implemented method further comprises:
    identifying a process identifier of the child process;
    determining a starting location in the captured memory array based on the process identifier of the child process;
    segmenting the captured memory array based on the starting location in the captured memory array; and
    passing the segmented memory array to the first program executing in the user space.

6. The computer-implemented method of claim 5 wherein the identifying of the process identifier of the child process, the determining of the starting location in the captured memory array, and the segmenting of the captured memory array are performed in the kernel space by the first eBPF program.

7. The computer-implemented method of claim 4 wherein the second program is a binary program executing in the user space and the subset of the second program comprises one or more second eBPF programs executing in the kernel space, and wherein the computer-implemented method further comprises:

identifying the one or more placeholder locations in each second eBPF program of the one or more second eBPF programs; and loading the memory offset value of the host kernel into each second eBPF program of the one or more second eBPF programs at the identified one or more placeholder locations.

8. The computer-implemented method of claim 1 further comprising:

building, on the build system, a deployment package comprising the first program and the second program, wherein the building of the deployment package further comprises:

compiling a preflight eBPF program into preflight bytecode;

generating preflight source code from the preflight bytecode;

combining the preflight source code with one or more different sets of preflight source code; and building the first program from the combined preflight source code.

9. The computer-implemented method of claim 8 further comprising:

compiling a plurality of sensor eBPF programs into a plurality of sets of sensor bytecode;

compiling each set of sensor bytecode of the plurality of sets of sensor bytecode into a set of sensor source code of a plurality of sets of sensor source code;

modifying each set of sensor source code of the plurality of sets of sensor source code by inserting one or more offset placeholders into each set of sensor source code of the plurality of sets of sensor source code;

combining the modified plurality of sets of sensor source code;

building the second program from the combined modified plurality of sets of sensor source code; and deploying the deployment package from the build system to the target host over a computer network in response to the building of the first program and the second program.

10. An information handling system comprising:
one or more processors;
a memory coupled to at least one processor of the one or more processors; and
a set of computer program instructions stored in the memory and executed by at least one processor of the one or more processors in order to perform actions comprising:
loading a first program and a second program on a target host comprising a host kernel, wherein both the first program and the second program are pre-compiled by a build system that is different from the target host;
executing at least a subset of the first program on the host kernel, wherein the subset of the first program captures a set of kernel structure information from the host kernel;
loading, at the target host, the set of kernel structure information into the second program at one or more placeholder locations; and
executing at least a subset of the second program with the set of kernel structure information loaded at the target host at the one or more placeholder locations.

11. The information handling system of claim 10 wherein the first program is a kernel parameter-independent program and the second program is a kernel parameter-dependent program, and wherein the first program is a binary program executing in user space and the subset of the first program is a first extended Berkley Packet Filter (eBPF) program executing in kernel space.

12. The information handling system of claim 11 wherein the one or more processors perform additional actions comprising:

loading, by the first program, the first eBPF program into the host kernel;

in response to loading the first eBPF program into the host kernel, invoking a trigger event by the first program that causes the host kernel to fork a child process and exit the child process;

capturing, by the first eBPF program, a memory array corresponding to the host kernel in response to the host kernel exiting the child process; and determining a memory offset value of the host kernel based on the captured memory array.

13. The information handling system of claim 12 wherein, in response to the host kernel exiting the child process, the one or more processors perform additional actions comprising:

identifying a process identifier of the child process;

determining a starting location in the captured memory array based on the process identifier of the child process;

segmenting the captured memory array based on the starting location in the captured memory array; and passing the segmented memory array to the first program executing in the user space.

14. The information handling system of claim 13 wherein the identifying of the process identifier of the child process, the determining of the starting location in the captured memory array, and the segmenting of the captured memory array are performed in the kernel space by the first eBPF program.

15. The information handling system of claim 12 wherein the second program is a binary program executing in the user space and the subset of the second program comprises one or more second eBPF programs executing in the kernel space, and wherein the one or more processors perform additional actions comprising:

identifying the one or more placeholder locations in each second eBPF program of the one or more second eBPF programs; and loading the memory offset value of the host kernel into each second eBPF program of the one or more second eBPF programs at the identified one or more placeholder locations.

16. The information handling system of claim 10 wherein the one or more processors perform additional actions comprising:

building, on the build system, a deployment package comprising the first program and the second program, wherein the building of the deployment package further comprises:

compiling a preflight eBPF program into preflight bytecode;

generating preflight source code from the preflight bytecode;

combining the preflight source code with one or more different sets of preflight source code; and building the first program from the combined preflight source code.

17. The information handling system of claim 16 wherein the one or more processors perform additional actions comprising:

compiling a plurality of sensor eBPF programs into a plurality of sets of sensor bytecode;

compiling each set of sensor bytecode of the plurality of sets of sensor bytecode into a set of sensor source code of a plurality of sets of sensor source code;

modifying each set of sensor source code of the plurality of sets of sensor source code by inserting one or more offset placeholders into each set of sensor source code of the plurality of sets of sensor source code;

combining the modified plurality of sets of sensor source code;

building the second program from the combined modified plurality of sets of sensor source code; and deploying the deployment package from the build system to the target host over a computer network in response to the building of the first program and the second program.

18. A computer program product stored in a computer readable storage medium, comprising computer program code that, when executed by an information handling system, causes the information handling system to perform actions comprising:

loading a first program and a second program on a target host comprising a host kernel, wherein both the first program and the second program are pre-compiled by a build system that is different from the target host;

executing at least a subset of the first program on the host kernel, wherein the subset of the first program captures a set of kernel structure information from the host kernel;

loading, at the target host, the set of kernel structure information into the second program at one or more placeholder locations; and executing at least a subset of the second program with the set of kernel structure information loaded at the target host at the one or more placeholder locations.

19. The computer program product of claim 18 wherein the first program is a kernel parameter-independent program and the second program is a kernel parameter-dependent program, and wherein the first program is a binary program executing in user space and the subset of the first program is a first extended Berkley Packet Filter (eBPF) program executing in kernel space.

20. The computer program product of claim 19 wherein the information handling system performs additional actions comprising:

loading, by the first program, the first eBPF program into the host kernel;

in response to loading the first eBPF program into the host kernel, invoking a trigger event by the first program that causes the host kernel to fork a child process and exit the child process;

capturing, by the first eBPF program, a memory array corresponding to the host kernel in response to the host kernel exiting the child process; and determining a memory offset value of the host kernel based on the captured memory array.

21. The computer program product of claim 20 wherein, in response to the host kernel exiting the child process, the information handling system performs additional actions comprising:

identifying a process identifier of the child process;

determining a starting location in the captured memory array based on the process identifier of the child process;

segmenting the captured memory array based on the starting location in the captured memory array; and passing the segmented memory array to the first program executing in the user space.

22. The computer program product of claim 21 wherein the identifying of the process identifier of the child process, the determining of the starting location in the captured memory array, and the segmenting of the captured memory array are performed in the kernel space by the first eBPF program.

23. The computer program product of claim 20 wherein the second program is a binary program executing in the user space and the subset of the second program comprises one or more second eBPF programs executing in the kernel space, and wherein the information handling system performs additional actions comprising:

identifying the one or more placeholder locations in each second eBPF program of the one or more second eBPF programs; and loading the memory offset value of the host kernel into each second eBPF program of the one or more second eBPF programs at the identified one or more placeholder locations.

24. The computer program product of claim 18 wherein the one or more processors perform additional actions comprising:

building, on the build system, a deployment package comprising the first program and the second program, wherein the building of the deployment package further comprises:

compiling a preflight eBPF program into preflight bytecode;

generating preflight source code from the preflight bytecode;

combining the preflight source code with one or more different sets of preflight source code; and building the first program from the combined preflight source code.

25. The computer program product of claim 24 wherein the information handling system performs additional actions comprising:

compiling a plurality of sensor eBPF programs into a plurality of sets of sensor bytecode;

compiling each set of sensor bytecode of the plurality of sets of sensor bytecode into a set of sensor source code of a plurality of sets of sensor source code;

modifying each set of sensor source code of the plurality of sets of sensor source code by inserting one or more offset placeholders into each set of sensor source code of the plurality of sets of sensor source code;

combining the modified plurality of sets of sensor source code;

building the second program from the combined modified plurality of sets of sensor source code; and deploying the deployment package from the build system to the target host over a computer network in response to the building of the first program and the second program.

* * * * *